Figure 1:

United States Patent [19]

Kobashi et al.

[11] 4,009,138
[45] Feb. 22, 1977

[54] PROCESS FOR PRODUCING STABLE EMULSION OF POLYMER

[75] Inventors: Toshiyuki Kobashi; Kenichi Masuhara, both of Okayama, Japan

[73] Assignee: Japan Exlan Company Limited, Japan

[22] Filed: Apr. 3, 1975

[21] Appl. No.: 564,892

[30] Foreign Application Priority Data

Apr. 6, 1974 Japan .................. 49-39153

[52] U.S. Cl. .............. 260/29.6 RW; 260/29.6 SQ; 260/29.7 W; 260/29.7 UP
[51] Int. Cl.² ......................................... C08L 33/02
[58] Field of Search .......... 260/29.6 RW, 29.6 SQ, 260/29.7 W, 29.7 UP, 79.3 MU, 29.6 TA

[56] References Cited

UNITED STATES PATENTS

| | | | |
|---|---|---|---|
| 2,883,369 | 4/1959 | Rees | 260/29.6 RW |
| 3,203,938 | 8/1965 | Baechtold | 260/79.3 MU |
| 3,340,238 | 9/1967 | Smith et al. | 260/79.3 MU |
| 3,617,368 | 11/1971 | Gibbs | 260/29.6 SQ |

FOREIGN PATENTS OR APPLICATIONS 47-606  1/1972  Japan

*Primary Examiner*—M. J. Welsh
*Attorney, Agent, or Firm*—Wenderoth, Lind & Ponack

[57] ABSTRACT

There is provided a process for preparing a stable polymer emulsion characterized by polymerizing a radical-polymerizable monomer having unsaturated bond by using a water-soluble catalyst in an aqueous medium and in the presence of a water-soluble polymer containing chemically bonded monomeric units of methacrylic acid or its salt and monomeric units of ethylenically unsaturated sulfonic acid or its salt, said polymerization being conducted at a pH of 4 or lower.

10 Claims, 1 Drawing Figure

PROCESS FOR PRODUCING STABLE EMULSION OF POLYMER

This invention relates to a novel process for the emulsion-polymerization of radical polymerizable monomers having unsaturated bonds and more particularly to a process for readily obtaining chemically and mechanical stable polymer emulsion which can not be easily obtained by an ordinary emulsion-polymerization and which contains polymer particles of small diameters.

The emulsion-polymerization process has been extensively applied to the preparation of various industrially important polymers such as styrene-butadiene copolymer rubber, polystyrene, styrene-acrylonitrile copolymer resin and ABS resin. Generally such polymer is separated from a polymer emulsion obtained by the polymerization and is used for plastic molding. However, it has recently become important to use polymer emulsions as they are without isolating the polymers for such uses as for coating films, coating materials for paper, binders for aqueous paints and reinforcing materials for concrete, for the purposes of reinforcement, dampproofing and gas interception.

Generally, when a polymer emulsion is used as such, the stability of the emulsion is very important problem. Therefore, various suggestions have been made for the improvement of such stability. However, they all relate to emulsifiers such as changing the kinds of emulsifiers or increasing the amounts of emulsifiers to be used and therefore there have still been involved drawbacks inherent to emulsifiers themselves.

For example, when a polymer emulsion is used as a material for coating films, coating material for paper or binder for aqueous paints, foams will be produced in the emulsion due to the emulsifier contained in the emulsion, causing the formation of pinholes in the coating film, which will reduce the dampproofness of the coated film and deteriorate the workability and finish in the case of painting.

Further, as an important example, there can be mentioned a polymer cement utilizing a polymer emulsion as a curing agent and reinforcing material for concrete. That is to say, the stability of such emulsion, when mixed with a cement, is likely to be broken by $Ca^{++}$ and $Al^{+++}$ dissolved out of the cement, so that it is usual to use large amounts of an emulsifier and stabilizer in order to prevent the coagulation of the emulsion. Therefore, when the emulsion is mixed and kneaded with the cement, foaming or bubbling will occur and not only the strength of the produced concrete will be remarkably reduced but also the workability will be impaired. Therefore, in order to prevent such foaming at the time of mixing and kneading, a large amount of a antifoaming agent has been further added to the emulsion. However, being a low molecular weight substance, such emulsifier and antifoaming agent will harden the cement, will particularly deteriorate the various properties of the polymer film produced by the hydrating reaction and hardening of the cement.

Further, in such uses of the polymer emulsion, it is a main object to utilize the film forming property after the emulsion is applied. However, such film forming property is remarkably influenced not only by the composition of the polymer particles but also by the particle diameters. Therefore, it is very important to obtain a polymer emulsion which is high in the film forming property and has fine polymer particle diameters. Further, when the polymer particles in the emulsion are small, the emulsion is more easily penetrated into the material to be treated and therefore the adhesiveness thereof to the material becomes higher.

However, in the conventional emulsion-polymerization process for producing polymer emulsions, the particle diameters of the polymer depend mostly on the amount of the emulsifier to be used and the larger the amount of the emulsifier, the smaller the obtained particle diameters. But, in consideration of the above described various drawbacks to be caused by the emulsifier, there has been naturally a limit to making the particle diameters of the produced polymer small by increasing the amount of the emulsifier.

In order to overcome such drawbacks due to the presence of an emulsifier, it has been suggested to copolymerize vinyl chloride and some kind of acid monomer and introduce carboxylic acid groups into the polymer in obtaining a vinyl chloride polymer emulsion (Japanese Patent Publication No. 30068/68). In such process, it will be possible to reduce the amount of the emulsifier. However, even in such process, if the emulsifier is not used at all, the polymerization system will become unstable, a large amount of coagulation product will be formed, it will be difficult to obtain an emulsion of a high polymer concentration, and further the polymer particle diameters in the obtained emulsion will be large, the viscosity of the emulsion will become high and no essentially favorable emulsion will be able to be obtained.

Further, according to Japanese patent publication No. 606/72 there is used a certain kind of water-soluble polymer instead of the conventional emulsifier to overcome various drawbacks based on the conventional emulsifier. However, in this method, it is intended to take a polymer out of an emulsion, and therefore its sole object is to obtain large polymer particles and this method can never be utilized for the production of a polymer emulsion which is used as such without separation of the polymer.

We have now found that a chemically and mechanically stable emulsion containing very fine polymer particles can be prepared without using an ordinary emulsifier but using a water-soluble polymer having a specific composition instead of the emulsifier.

An object of the present invention is to provide a process for stably obtaining chemically and mechanically stable emulsion containing a polymer of small particle diameters which has not been able to be easily obtained by the conventional emulsion-polymerization process.

Another object of the present invention is to obtain a polymer emulsion in which foaming or bubbling is inhibited and which can provide improved property of the formed film.

A further object of the present invention is to provide a polymer emulsion whose property is remarkably improved for processing or modifying fibers, paper, etc. and for mixing with an aqueous paint, binder, concrete and mortar.

Such objects of the present invention can be attained by polymerizing a radical-polymerizable monomer having an unsaturated bond by using a water-soluble catalyst in an aqueous medium in the presence of a water-soluble polymer substantially bonding and containing monomer units of an ethylenically unsaturated carboxylic acid or its salt and monomer units of an ethylenically unsaturated sulfonic acid or its salt.

The polymer emulsion obtained according to the process of the present invention is much more stable against an electrolyte than a similar polymer emulsion prepared by using a normally used amount of an ordinary emulsifier. Therefore, even when mixed with a cement, the polymer emulsion according to the present invention will not cause such coagulation as seen in a polymer emulsion prepared by the conventional emulsion-polymerization process. Therefore, the stabilizing operation by the addition of a non-ionic surface active agent as is usually adopted in mixing a polymer emulsion with a cement is not required. In order to avoid foaming or bubbling caused by the addition of a non-ionic surface active agent, it has been conventional to add an anti-foaming agent such as a silicone. However, the polymer emulsion according to the present invention makes it unnecessary to use such anti-foaming agent. Therefore, the disadvantages to be caused by such surface active agent and anti-foaming agent can be essentially eliminated.

Further, the particles of the polymer in the polymer emulsion obtained by the present invention are so fine that, when the polymer emulsion is applied to various uses, it will easily penetrate the material to be treated and therefore is high in the adhesiveness and film forming property. The film surface formed in painting is very smooth and its luster is improved.

In an ordinary polymer emulsion, it is usual that a large amount of a hydrophilic or water-soluble dispersing agent is added to stabilize the dispersion of particles so that there have been problems in the resistance to water of the film formed therefrom. However, according to the present invention, a polymer emulsion high in the freezing stability and mechanical stability can be obtained with a small amount of a water-soluble polymer used as a dispersing agent and therefore the resistance to water of the formed film can be remarkably improved as compared with a conventional one.

The water-soluble polymer to be used in the present invention is a polymer which has chemically bonded monomer unit (component A) consisting of an ethylenically unsaturated carboxylic acid or its salt and monomer unit (component B) consisting of an ethylenically unsaturated sulfonic acid or its salt as polymer forming units and which is water-soluble. The water-soluble polymer may be prepared in any suitable way. Generally it can be prepared by copolymerizing (preferably solution-polymerizing by using water as a polymerization medium) the components A and B by a well known process. It is also possible to produce such polymer by introducing the component A into the polymer by hydrolyzing a copolymer obtained by copolymerizing an unsaturated carboxylic ester such as an acrylic ester or by introducing the component B by sulfonating the polymer.

The proportions of the components A and B in such water-soluble polymer may vary depending on the particular kind of the radical-polymerizable monomers having unsaturated bond to be emulsion-polymerized. However, it is preferable to use a range of the component A/component B = 30 to 80 %/70 to 20 %. Further, the polymerization degree of such polymer is not particularly limited but, in a practical molecular weight range, it appears that, when a polymer lower in the molecular weight is used, a polymer emulsion of finer particle diameters will be obtained. Further, depending on the particular kind of the monomer having a radical-polymerizable unsaturated bond to be emulsion-polymerized, a better emulsion will be obtained in some cases by using a water-soluble polymer obtained by copolymerizing or graft-polymerizing a small amount of a hydrophobic monomer such as vinylidene chloride in addition to the components A and B. Therefore, such polymer is also included in the range of the water-soluble polymers to be used in the present invention.

As the components A to be introduced into such water-soluble polymer, there can be enumerated unsaturated univalent carboxylic acids such as acrylic acid, methacrylic acid, vinylacetic acid and crotonic acid and their salts such as of sodium, potassium, ammonium, etc.; unsaturated polyvalent carboxylic acids such as maleic acid, fumaric acid, itaconic acid, aconitic acid, citraconic acid and mesaconic acid and their salts such as of sodium, potassium, ammonium, etc. Particularly from the viewpoint of the stability and particle diameters of the emulsion, it is recommended to introduce a monomer unit consisting of methacrylic acid or its salt. As the components B, there can be enumerated sulfonated unsaturated hydrocarbons such as sulfonated styrene, allylsulfonic acid and methallylsulfonic acid and their salts such as of sodium, potassium, ammonium, etc.; sulfoalkyl esters of acrylic acid or methacrylic acid such as methacrylic sulfoethyl ester and methacrylic sulfopropyl ester and their salts such as of sodium, potassium, ammonium, etc.

The polymer emulsion according to the present invention may be prepared in the same manner as in the conventional emulsion-polymerization process except that the above mentioned water-soluble polymer is used instead of conventional emulsifier. Thus, for example, the monomer to be polymerized, the above mentioned water-soluble polymer in an amount of 0.5 to 10 % by weight based on the amount of said monomer and water wherein is dissolved a predetermined amount of a water-soluble catalyst are fed to a polymerization system, and the monomer is polymerized by a batch-polymerization or continuous polymerization process at a predetermined temperature while adjusting the pH of the polymerization system. If necessary, a chain transfer agent or the like may be added to the polymerization system.

The amount of the catalyst may be as usual in conventional emulsion polymerization process. Thus, for example, the catalyst may be employed in an amount of 0.05–5 %, preferably 0.1–3 % by weight based on the monomer to be polymerized. The polymerization temperature is usually 0°–100° C., preferably 10°–80° C. The polymerization pH may range from an acidic region to about 7 when a persulfate alone is used as the catalyst. However, generally, it is preferable that the pH is adjusted to be 4 or lower. Particularly when a water-soluble redox catalyst is employed it is not preferable to conduct the polymerization at a pH higher than 4 because the particle diameters of the produced polymer will be so large and the coagulation of the emulsion will be so likely to occur that it will be difficult to prepare a stable polymer emulsion.

The radical-polymerizable monomer having unsaturated bond to be subjected to the polymerization may be any monomer which can be emulsion-polymerized. For example, there can be used conjugated diene monomers such as butadiene and isoprene; aromatic vinyl monomers such as styrene, α-methylstyrene and chlorostyrene; vinyl cyanide monomers such as acrylonitrile and methacrylonitrile; acrylic esters and methacrylic esters such as methyl acrylate, ethyl acrylate, butyl acrylate, methyl methacrylate ethyl methacrylate and butyl methacrylate; vinyl and vinylidene halides such as vinyl chloride, vinyl bromide, vinylidene chloride and vinylidene bromide; vinyl esters such as vinyl acetate and vinyl propionate. A mixture of two or more of them may also be used. Particularly, in the polymerization of aromatic vinyl monomers and hydrophobic monomers such as vinyl and vinylidene halides, favorable results are obtained.

Further, as the polymerizing catalyst, there can be used any known radical generating water-soluble polymerizing catalyst such as a persulfate. However, it is preferable to use a redox catalyst consisting of a combination of a persulfate and reductive sulfoxy compound (and/or ferrous ions) or a combination of a chlorate and reductive sulfoxy compound.

The polymer emulsion thus obtained according to the present invention is an emulsion of very fine particle diameters and is high in the stability against an electrolyte and has excellent freezing stability and mechanical stability so that it can be advantageously used for such uses as for modifying fibers, processing fibers, processing paper and for mixing with an aqueous paint, binder, concrete and mortar.

It is not exactly known why the water-soluble polymer to be used in the present invention shows such excellent effect an emulsifier in the production of a polymer emulsion. However, it seems to be probable that the monomer having a radical-polymerizable unsaturated bond would graft-polymerize on a part of the water-soluble polymer so that the resulting graft-copolymer to which both hydrophilic and hydrophobic properties are imparted acts excellently as an emulsifier.

However, in case the graft-polymerization of the above mentioned monomer on the water-soluble polymer occurs too much, the graft-copolymer will become too hydrophobic so that it can not sufficiently effectively work as an emulsifier. On the other hand, in case the graft-polymerization does not sufficiently occur, the effect as an emulsifier will become insufficient.

Therefore, in order to obtain a stable polymerization state, it is very important to select the emulsifier in the conventional emulsion-polymerization process. In the same sense also, in the present invention, it is considered to be most important to obtain a graft-copolymer which can develop the effect of an emulsifier to the maximum. It is deemed that the present invention is made possible by selecting a water-soluble polymer which can cause such proper graft-polymerization.

The invention will be further explained by the following examples and by referring partly to accompanied the drawing (FIG. 1) which is an electron-microscopic photograph (× 20000) of a polymer emulsion obtained according to this invention. In these examples, all the percentages and parts are by weight unless otherwise specified.

EXAMPLE 1

Five kinds of water-soluble copolymers of methacrylic acid (MAA) and sodium p-styrenesulfonate (SPSS) were prepared with the polymerization compositions shown in the following.

| Copolymers | I | II | III | IV | V |
|---|---|---|---|---|---|
| MAA/SPSS | 100/0 | 50/50 | 70/30 | 80/20 | 0/100 |

In conducting the polymerization, 2 parts of ammonium persulfate, 1.8 parts of sodium bisulfite, 0.0015 part of ferrous chloride and 230 parts of ion exchanged water were added to 100 parts of the monomeric mixture, and the monomer was polymerized for 1 hour at 70° C. under stirring. The resulting polymer solution was dissolved as such in water and the solution was used in the subsequent emulsion-polymerization.

The polymerization prescription used for the emulsion-polymerization was as follows.

| Materials | Parts |
|---|---|
| Vinylidene chloride | 38 |
| Water-soluble polymer (I, II, III, IV or V) | 2 |
| Ammonium persulfate | 0.2 |
| Sodium bisulfite | 0.18 |
| Ferrous chloride | 0.00006 |
| Ion exchanged water | 60 |

In conducting this emulsion polymerization, a liquid prepared by dissolving the water-soluble polymer and ferrous chloride in 55 parts of the ion exchanged water was fed into a polymerization tank. Then the vinylidene chloride was fed and then stirring was started. Then 2.5 parts of the liquid prepared by dissolving the ammonium persulfate and sodium bisulfite in the ion exchanged water were dropwise added into the polymerization tank to start the polymerization. The rate of dropwise addition was controlled so that the addition of such catalyst solution is completed in an hour. The pH of the polymerization system was less than 3 in each case and therefore was not particularly controlled. The polymerization reaction was carried out for 2 hours at 30° C. under the atmospheric pressure. The obtained polymer emulsion was observed under a microscope to confirm that there was no unreacted monomer.

The particle diameters of the polymer present in each of the thus obtained various emulsions could not be measured with an optical microscope. Therefore, the light transmittancy of the emulsion was measured by using a photoelectric colorimeter (FPW-4 Type, K.K. Hitachi Seisakusho) and the relative particle state of the emulsion was evaluated thereby. In measuring the transmittancy, the emulsion obtained by the polymerization was diluted with ion-exchanged water to be 100 times and was used for the measurement.

The results are as follows. The viscosity of the emulsion before the dilution is also shown.

| Water-soluble polymer | I | II | III | IV | V |
|---|---|---|---|---|---|
| Viscosity (centipoises) | Impossible to measure (almost solidified) | 8.3 | 6.1 | 10.5 | Impossible to measure (almost solidified |
| Transmittancy (%) | 0 | 38 | 54 | 36 | 0 |

From the above result it was observed that, in case the homopolymer (I or V) of methacrylic acid or sodium p-styrenesulfonate was used as the water-soluble polymer, the viscosity of the emulsion was increased with the progress of the polymerization, and finally the emulsion had no fluidity and the polymer particles became a large conglomeration. On the other hand, in case the copolymer (II, III or IV) of methacrylic acid and sodium p-styrenesulfonate was used, an emulsion containing very finely dispersed polymer particles was obtained. Particularly it is presumed from the above mentioned results of the transmittancy that, in case the water-soluble polymer containing about 70 % methacrylic acid was used, an emulsion having the best dispersed state was obtained.

The photograph (FIG. 1) is that taken by an electron microscope ($\times$ 20000) of the polymer emulsion obtained by the polymerization (by the use of the water-soluble polymer (II) of the monomeric composition of MAA/SPSS = 50/50) and it was confirmed that, even in such emulsion, almost all the polymer particles are so fine as to be less than 0.05 micron in the diameter. Further, when 10 parts of calcium chloride were added to 100 parts of this emulsion, the emulsion was never coagulated, indicating that the emulsion is very stable against an electrolyte. When this emulsion was frozen by cooling to $-50°$ C. with a dry ice-methanol system and was then melted by warming, it recovered to the original dispersed state, indicating therefore that it is very stable against freezing.

For comparison, the same emulsion polymerization as above was repeated except that polyvinyl alcohol, polyethylene glycol, polyacrylamide or acrylamide-SPSS copolymer was used instead of the above described MAA/SPSS copolymer as the water-soluble polymer. In each case, the produced polymer particles conglomerated, the polymerization system became pasty and no satisfactory emulsion could be obtained.

EXAMPLE 2

Vinylidene chloride was emulsion-polymerized under the same conditions as in Example 1 by using a water-soluble polymer (component A/component B = 50/50) obtained by using 2-acrylamide-2-methylpropanesulfonic acid, sulfopropyl methacrylate or sulfoethyl methacrylate instead of SPSS as the component B and methacrylic acid as the component A. In each case, there was obtained a polymer emulsion containing the fine polymer particles, low in the viscosity and showing a favorable dispersion state.

On the other hand, in case a homopolymer of only the above described component B was used as the water-soluble polymer, the produced polymer particles conglomerated and the emulsion became so high in the viscosity as to finally show no fluidity.

EXAMPLE 3

A monomeric mixture of vinylidene chloride/methyl acrylate = 90/10 was emulsion-polymerized by using a copolymer of MAA/SPSS = 70/30 obtained in Example 1 as the water-soluble polymer. Thus, 2 parts of the water-soluble polymer and 0.0006 part of ferrous chloride were dissolved in 60 parts of ion exchanged water. The solution was charged into a polymerization vessel and then 1 part of vinylidene chloride was added thereto. Further, 0.05 part of ammonium persulfate and 0.04 part of sodium bisulfite were added and the polymerization was started under stirring at 30° C. In 30 minutes after the start of the polymerization, a monomeric mixture of 35 parts of vinylidene chloride and 4 parts methyl acrylate was added and further 0.15 part of ammonium persulfate and 0.14 part of sodium bisulfite were added. Then the polymerization was continued for 1 hour. As a result, an excellent emulsion of a low viscosity containing fine particles of a vinylidene chloride-methyl acrylate copolymer was obtained at a yield of about 100 %.

EXAMPLE 4

An emulsion-polymerization was conducted under the same conditions as in Example 3 except that styrene was used instead of the monomeric mixture of vinylidene chloride/methyl acrylate.

In this case, in 30 minutes after the polymerization a small amount of vinylidene chloride was polymerized, and then there were added 39 parts of styrene, 0.3 part of ammonium persulfate and 0.27 part of sodium bisulfite. Then the polymerization was continued for 3 hours at 60° C. As a result, an emulsion of a favorable state of dispersion was obtained.

EXAMPLE 5

Vinylidene chloride was polymerized under the same conditions as in Example 1 by using a copolymer obtained by polymerizing a composition of methacrylic acid/acrylic acid/sodium p-styrenesulfonate = 70/10/20. There was obtained a polymer emulsion of a viscosity of 12.3 centipoises and light transmittancy of 32 %.

EXAMPLE 6

Vinyl chloride was polymerized in an autoclave. The materials used were as follows:

| | | |
|---|---|---|
| Vinyl chloride | 40 | parts |
| Water-soluble polymer (MAA/SPSS = 70/30) | 2.0 | parts |
| Ammonium persulfate | 0.2 | part |
| Sodium bisulfite | 0.2 | " |
| Ferrous chloride | 0.01 | " |
| Ion exchanged water | 60 | parts |

The polymerization was conducted for 3 hours by controlling the polymerization temperature to be 40° C. There was obtained a polymer emulsion low in the viscosity at a polymerization yield of 100 %.

EXAMPLE 7

By using an autoclave in the same manner as in Example 6, vinyl bromide was homopolymerized and a mixed monomer of a composition of vinyl bromide/vinylidene chloride = 50/50 was copolymerized.

As a result of the polymerization under the same conditions as in Example 6 except that the polymerization time was 10 hours in the case of the homopolymerization of vinyl bromide and 4.5 hours in the case of the copolymerization of vinyl bromide/vinylidene/chloride. In each case, an emulsion of very fine particle diameters and a low viscosity was obtained at a polymerization yield of more than 95 %. The stability of the emulsion was high.

What we claim is:

1. A process for preparing a stable polymer emulsion characterized by polymerizing a radical-polymerizable monomer having unsaturated bond by using a water-soluble catalyst in an aqueous medium and in the presence of a water-soluble polymer containing chemically bonded monomeric units of methacrylic acid or its salt and monomeric units of ethylenically unsaturated sulfonic acid or its salt, said polymerization being conducted at a pH of 4 or lower.

2. A process as claimed in claim 1 wherein the water-soluble polymer is used in an amount of 0.5-10 % by weight based on the monomer to be polymerized.

3. A process as claimed in claim 1 wherein the ethylenically unsaturated sulfonic acid or its salt is selected from the group consisting of sulfonated unsaturated hydrocarbons, sulfoalkyl esters of acrylic acid and methacrylic acid and their salts.

4. A process as claimed in claim 3 wherein the ethylenically unsaturated sulfonic acid or its salt is selected from the group consisting of sodium p-styrene sulfonate, 2-acrylamide-2-methylpropane sulfonic acid, sulfoethyl methacrylate and sulfopropyl methacrylate.

5. A process as claimed in claim 1 wherein the monomer to be polymerized is at least one selected from the group consisting of conjugated diene monomers, aromatic vinyl monomers, cyanated vinyl monomers, acrylic esters, methacrylic esters, halogenated vinyl monomers, halogenated vinylidene monomers and vinyl esters.

6. A process as claimed in claim 5 wherein the monomer to be polymerized is at least one selected from the group consisting of vinyl chloride, vinyl bromide, vinylidene chloride, methyl acrylate and styrene.

7. A process as claimed in claim 1 wherein the water-soluble polymer is obtained by copolymerizing an ethylenically unsaturated carboxylic acid or its salt and ethylenically unsaturated sulfonic acid or its salt in an aqueous medium.

8. A process as claimed in claim 1 wherein the water-soluble polymer consists of 30 to 80% by weight of the methacrylic acid or its salt and 70 to 20% by weight of the ethylenically unsaturated sulfonic acid or its salt.

9. A process as claimed in claim 1 wherein a part of the methacrylic acid or its salt in the water-soluble polymer is replaced with acrylic acid or its salt.

10. A process as claimed in claim 1 wherein the water-soluble catalyst is a water-soluble redox catalyst.

* * * * *